United States Patent
Desai et al.

(10) Patent No.: US 12,086,110 B1
(45) Date of Patent: Sep. 10, 2024

(54) SYSTEMS AND METHODS FOR DATA INPUT, COLLECTION, AND VERIFICATION USING DISTRIBUTED LEDGER TECHNOLOGIES

(71) Applicant: United Services Automobile Association (USAA), San Antonio, TX (US)

(72) Inventors: Snehal Desai, Richardson, TX (US); Nolan Serrao, Plano, TX (US); Bharat Prasad, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 193 days.

(21) Appl. No.: 16/536,087

(22) Filed: Aug. 8, 2019

Related U.S. Application Data (60) Provisional application No. 62/768,605, filed on Nov. 16, 2018.

(51) Int. Cl.
*G06F 16/182* (2019.01)
*G06Q 40/08* (2012.01)
*H04L 9/06* (2006.01)

(52) U.S. Cl.
CPC ......... *G06F 16/1837* (2019.01); *G06Q 40/08* (2013.01); *H04L 9/0637* (2013.01)

(58) Field of Classification Search
CPC .... G06F 16/1837; G06Q 40/08; H04L 9/0637
USPC ........................................................ 707/827
See application file for complete search history.

(56) References Cited

U.S. PATENT DOCUMENTS

| | | | |
|---|---|---|---|
| 10,521,780 B1* | 12/2019 | Hopkins, III et al. . | G06Q 20/10 |
| 2010/0324943 A1* | 12/2010 | Klibanow ............. | G06Q 40/00 |
| | | | 705/4 |
| 2019/0026425 A1* | 1/2019 | Downs et al. .......... | G06F 19/18 |
| 2019/0188706 A1* | 6/2019 | McCurtis ............... | G06Q 20/40 |
| 2019/0207770 A1* | 7/2019 | Zhou et al. ............. | H04L 9/32 |
| 2019/0236559 A1* | 8/2019 | Padmanabhan ........ | G06Q 20/06 |
| 2019/0236598 A1* | 8/2019 | Padmanabhan ........ | G06Q 20/38 |
| 2019/0238316 A1* | 8/2019 | Padmanabhan .......... | H04L 9/06 |
| 2019/0303867 A1* | 10/2019 | Nair ....................... | G06Q 10/10 |

OTHER PUBLICATIONS

Arun Iyengar et al., A Trusted Healthcare Data Analytics Cloud Platform, Jul. 1, 2018, IBM T. J. Watson Research Center, Yorktown Heights, NY, 2018 IEEE International Conference on Distributed Computing Systems. (Year: 2018).*

* cited by examiner

*Primary Examiner* — Bennett M Sigmond
*Assistant Examiner* — George N. Proios
(74) *Attorney, Agent, or Firm* — Fletcher Yoder P.C.

(57) ABSTRACT

Embodiments are described herein for data input, collection, and verification using information stored on a distributed ledger, such as a blockchain. A distributed ledger may securely store data relating to an insurance claim, for example. Use of a distributed ledger may provide an immutable, readily auditable record of the history of the insurance claim.

20 Claims, 7 Drawing Sheets

```
DCS_DATA_BLOCK#="676878",
DCS_CLAIM_RECORD#="6635829600016",
SUBMITTED_BY="FIRSTENTITY", DCS_CID="C368965",
```
*(68)*

| CUSTOMER'S INFORMATION: | CARRIER'S INFORMATION: | CLAIM INFORMATION: |
|---|---|---|
| ---- | ---- | ---- |
| ---- | ---- | ---- |
| ---- | ---- | ---- |

*(70)*

```
IP="TRUE", VERIFIED="FALSE", STEP#="0001",
VERIFIED#="N-A", STATE="INITIAL",
SUBMISSION NOTIFICATION TO="C368965",
REQUEST="TRUE", RESPONSE NEEDED="TRUE",
SEND_NOTIF TO NAME="SECONDENTITY",
SEND_NOTIF TO DCS_CID="C467283",
DATA_TYPE="CONFIRMATION REQUEST"
REQUEST_DETAILS="CONFIRMED REC_ELEM_#3#8#9",
ERROR_SET_TOTAL="0",
```
*(72)*

```
DCS_DATA_BLOCK#="676903",
DCS_CLAIM_RECORD#="6635829600016",
SUBMITTED_BY="SECONDENTITY", DCS_CID="C467283",
```
*(68)*

| CUSTOMER'S INFORMATION: | CARRIER'S INFORMATION: | CLAIM INFORMATION: |
|---|---|---|
| ---- | ---- | ---- |
| ---- | ---- | ---- |
| ---- | ---- | ---- |

*(70)*

```
IP="TRUE", VERIFIED="FALSE", STEP#="0006",
VERIFIED#="N-A", STATE="PARTIAL CONFIRM",
SUBMISSION NOTIFICATION TO="C467283",
REQUEST="TRUE", RESPONSE NEEDED="TRUE",
SEND_REQUEST TO NAME="FIRSTENTITY",
SEND_REQUEST TO DCS_CID="C368965",
DATA_TYPE="RESPONSE TO REQUEST"
REQUEST_BLOCK#="676878"
RESPONSE_DETAILS="CONFIRMED REC_ELEM_#3#8",
ERROR_SET_TOTAL="1", ERROR_CODE=
ERROR_TYPE="OBJ_NOT_FOUND"
ERROR_DETAILS="REC_ELEM_#9_NOT_FOUND, INCORRECT VIN#"
```
*(72)*

SYSTEMS AND METHODS FOR DATA INPUT, COLLECTION, AND VERIFICATION USING DISTRIBUTED LEDGER TECHNOLOGIES

CROSS-REFERENCE TO RELATED APPLICATION

The present disclosure is related to, and claims priority to, U.S. Provisional Patent Application Ser. No. 62/768,605, titled "Systems and Methods for Data Input, Collection, and Verification Using Distributed Ledger Technologies," which was filed on Nov. 16, 2018, which is herein incorporated by reference in its entirety for all purposes.

BACKGROUND

The present disclosure relates generally to systems and methods for data input, collection, and verification using blockchain and distributed ledger technologies.

The input, collection, and verification of data needed for the First-Notice-Of-Loss (FNOL) processes relating to insurance claims generally requires a number of phone calls, emails, and letters between the involved insurance carriers. These communications are often hindered by long wait times such as, for example, waiting for phone calls before they are answered by a human respondent, delays before emails are replied to with the correct information, and transit times incurred for regular mail, and so forth. These delays and dated communication techniques are expensive compared to the potential benefits of a more automated solution.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Embodiments of the present disclosure include blockchain systems, application programming interfaces (APIs), and methods of operation thereof, that may be used to implement and/or operate a distributed ledger system that includes one or more distributed ledgers for storing data relating to one or more insurance claims. The data includes one or more verifications for the respective insurance claim. The use of a blockchain infrastructure to implement a data input, collection, and verification system may allow a readily accessible, tamper-proof, resilient, and auditable platform for storage and tracking of the operations. The use of a data curation service, such as the one described herein, may further allow the data input, collection, and verification system to perform several operations automatically, in a transparent manner.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure reduce the number of touchpoints required in data input, collection, and verification, such as in the input, collection, and verification of data relating to insurance claims, by automating much of the recording, exchanging, notifying, correcting, and verifying of insurance claim-related data. This automation significantly reduces the drudgery involved in current data input, collection, and verification processes, thereby reducing the associated costs and delays.

Embodiments of the present disclosure utilize blockchain and distributed ledger techniques as a shared infrastructure that connects all the parties involved in the input, collection, and verification of data, and utilize the immutable nature of the distributed ledger to track the verification history of an insurance claim in electronic form. Using the embodiments described herein, the entire verification history of an insurance claim may be tracked on the blockchain/distributed ledger. Doing so, among other things, reduces the time to get data from multiple parties from weeks to months down to days or even hours, saves cost of mailing and fees for representative services, eliminates the risk of important insurance claims getting lost, and reduces fraud risks.

Embodiments of the present disclosure provide many advantages. Because the embodiments described herein employ distributed ledgers (e.g., blockchains) to store and publish information regarding particular insurance claims, the insurance claim data is immutable and less prone to fraud, destruction, or corruption compared to insurance claim data stored on traditional storage systems. Similarly, by providing a more secure and reliable mechanism for managing insurance claims, the embodiments described herein avoid the expenditure of computing resources that may be used when traditional systems are required to back out or otherwise reverse fraudulent or erroneously collected insurance claim data Moreover, through the utilization of a data curation service that automates certain functions relating to the verification of insurance claim data, the embodiments described herein significantly increase the speed at which insurance claims may be processed, compared to conventional systems. Moreover, by managing insurance claims through distributed ledger system(s), the embodiments described herein provide superior electronic provenance compared to human-operated systems.

The embodiments described herein provide systems for tracking the verification history of insurance claims using the insurance claim data stored on distributed ledger(s). In certain embodiments, each entity participating in the systems may be assigned a unique identifier (ID) to be used for conducting transactions on the blockchain network. For example, in certain embodiments, an entity may be provided with a digital security token that is useable to authenticate the entity and enable access to the insurance claim data stored on the distributed ledger(s). In certain embodiments, the distributed ledger may be accessed to manage the transfer of an insurance claim from one entity to another (e.g., for the purpose of requesting input, collection, and/or verification of data relating to the insurance claim). In certain embodiments, a transaction describing the transfer of an insurance claim may be added to the (e.g., append-only) structure of the distributed ledger. In certain embodiments, if an entity wants to transfer the insurance claim to another entity, the current "possessor" entity may publish a transaction that transfers the insurance claim to the other entity.

As such, the embodiments described herein enable a state-based data curation model that implements a deterministic state machine that progressively modifies the state of an insurance claim record from an "initial" state to a "final" state, where multiple insurance carriers verify that the data that has been recorded in the blockchain by, for example, requiring attestations from all of the insurance carriers that are associated with the insurance claim record. More specifically, the data curation service described herein is configured to ensure that the final data block stored in the blockchain for a particular insurance claim record has been approved by each of the insurance carriers that have an interest in the insurance claim record. Accordingly, the embodiments described herein enable a reliable data checkpoint system for a given incident relating to the insurance claim record, which may be used for future processes such as subrogation, arbitration, litigation, and other such processes.

Similarly, the embodiments described herein also provide auditable tracking of error history and associated resolution history. For example, in certain embodiments, the data curation service described herein may be configured to prohibit multiple claim records to be created for a particular incident such that each unique incident is assigned a unique claim record identifier that is recorded in every data block written on the blockchain relating to the incident. Such functionality may, for example, allow an auditor to easily query all data blocks relating to a particular incident from a first data block to a final data block, which has been verified and attested to by all insurance carriers involved.

The embodiments described herein also enable continuous refinement by automating the input, collection, and verification of insurance claim data, thereby reducing the number of touchpoints (e.g., phone calls, emails, letters, and so forth), and the associated delays, required by conventional techniques. In addition, the embodiments described herein provide well-defined error codes, notification architecture, and state descriptions that lend themselves to be iteratively refined with new technology over time to, for example, allow for increasingly more automation of the FNOL process. These functionalities allow for a high degree of customization on the part of the individual insurance carriers.

For example, the embodiments described herein also enable automated evaluation for blockchain submission. In certain embodiments, an agent service running on each carrier network may automatically (e.g., without human intervention) or semi-automatically (e.g., with minimal human interaction, such as verification and approval) extract relevant data from a new auto loss report (ALR) and submit the data to a blockchain. More specifically, in certain embodiments, the data curation service described herein may expose certain function calls that facilitate the agent services executed by the insurance carriers to employ various levels of interaction, whether through automated functions, semi-automated functions, or manual functions. For example, in certain embodiments, the function calls exposed by the data curation service may include function calls that are specifically directed to automated interaction with the blockchain (e.g., that do not include human verification and approval functions), function calls that are specifically directed to manual interaction with the blockchain (e.g., that specifically include human verification and approval functions), and multiple variations therebetween. As such, the embodiments described herein enable customization of the degree of human interaction required, depending on the desires of the specific insurance carrier. For example, in certain embodiments, a first insurance carrier may desire to have more human interaction when submitting data to a blockchain, whereas a second insurance carrier may desire to have no human interaction at all, if possible. Indeed, by enabling customizable levels of human interaction, the embodiments described herein may allow insurance carriers to gradually decrease the degree of human interaction required by their own agent services, for example, as they become more comfortable with the functionality provided by the data curation service described herein.

Similarly, the embodiments described herein also enable automated querying of the blockchain. For example, in certain embodiments, the data curation service described herein includes a notification architecture (e.g., suite of function calls and related properties) that are configured to automatically invoke the agent services running on the insurance carrier networks to respond by either invoking automated querying services to, for example, correct invalid data or to escalate a query to a human respondent, if desired by the insurance carrier. In other words, in certain embodiments, when the data curation service determines that certain data verification is needed from a particular insurance carrier, the data curation service may send a notification to an agent service for that particular insurance carrier, which may prompt the agent service to take action by, for example, either automatically querying back end components (e.g., data servers, and so forth) to provide the data curation service with required response data or prompting a user associated with the insurance carrier that response data is required.

Figure 1:
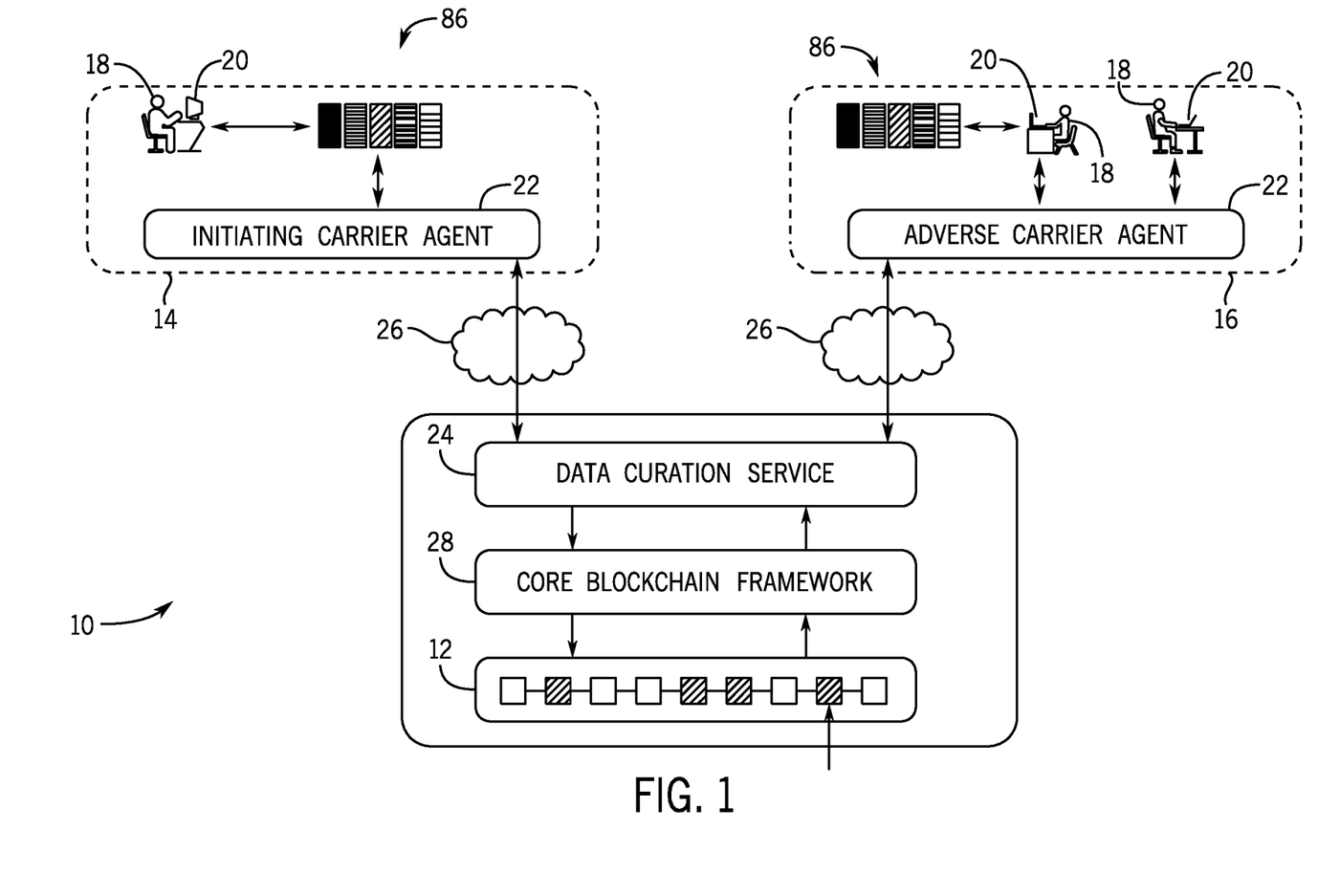
FIG. 1 illustrates a block diagram of a system for managing insurance claims using a distributed ledger, in accordance with embodiments described herein.

In general, the embodiments described herein utilize blockchain and distributed ledger techniques, as well as a data curation service that is configured to interact with the blockchain, in certain embodiments, to track a history of insurance claim data. FIG. 1 illustrates a block diagram of a system 10 for managing insurance claim data using a distributed ledger, such as a blockchain 12, in accordance with the embodiments described herein. In certain embodiments, the blockchain 12 may be a publicly available blockchain (e.g., available to any and every entity/user on a network, such as the internet). In other embodiments, the blockchain 12 may be a private blockchain (e.g., available to one or more entities/users that are credentialed on a network). In yet other embodiments, the blockchain 12 may be a hybrid blockchain (e.g., public-permissioned blockchain wherein the data is available as read-only for the public, but can only be written by a private member of the organization, such as an insurance carrier).

Although primary described herein as relating to insurance claim data (e.g., FNOL processes), it will be appreciated that the embodiments described herein may be equally applied to the input, collection, and verification of other types of data wherein multiple (e.g., often adverse) entities interact with each other to input and verify the data. As illustrated in FIG. 1, the system 10 may enable multiple entities 14, 16, such as an initiating insurance carrier entity 14 and an adverse insurance carrier entity 16, to enter data (e.g., relating to insurance claims), transfer the data between the entities 14, 16, make revisions to the data, and ultimately verify that all of the data is correct. In particular, multiple users 18 associated with the entities 14, 16 may utilize user devices 20 to enter data (e.g., relating to insurance claims), transfer the data between the entities 14, 16, make revisions to the data, and ultimately verify that all of the data is correct. The user device(s) 20 may include any appropriate type of computing device, such as portable device(s) (e.g., smartphones, tablet computers, wearable computers, etc.) and less mobile device(s) (e.g., desktop computers).

As illustrated in FIG. 1, in certain embodiments, the user devices 20 may execute, or otherwise interact with, applications 22 that enables the users 18 to access and/or modify insurance claim data for one or more insurance claim(s), which may be stored on the blockchain 12. In particular, in certain embodiments, the applications 22 may be configured to communicate with a data curation service 24 via one or more communication network(s) 26. The data curation service 24 may include executable logic (e.g., computer-readable instructions configured to be executed by a processor) that receives, records, revises, and so forth, the insurance claim data stored on the blockchain 12 by, for example, interacting with a core blockchain framework 28 associated with blockchain 12. Updates may be made by writing transactions to the append-only structure of the blockchain 12. In certain embodiments, the data curation service 24 may apply logic, e.g., according to one or more rules, to update the insurance claim data. For example, the data curation service 24 may apply logic to manage the transfer of an insurance claim between the entities 14, 16, by publishing transactions that indicate the transfer of the insurance claim (e.g., for the purpose of verifying the insurance claim data) on the blockchain 12.

By storing and publishing the insurance claim data on a blockchain 12 that is secure and append-only, such that information may be added to, but not deleted from, the blockchain 12, certain embodiments may ensure that the insurance claim data is not corrupted or fraudulent. Moreover, by storing the insurance claim data on a blockchain 12 that is distributed (e.g., not stored locally by either of the entities 14, 16), certain embodiments may reduce or eliminate the chance that the insurance claim data may be irrecoverably lost or destroyed, either intentionally or unintentionally during a natural disaster, fire, war, or other catastrophic event. As such, the blockchain 12 may provide security, traceability, and/or metadata to be used to settle challenges against, for example, the verification of data relating to a particular insurance claim.

As described herein, in certain embodiments, the data curation service 24 is a state machine with notification and error handling functions that facilitate the verification of insurance claim data. In particular, the embodiments described herein enable asynchronous operation of the exchange of insurance claim data, where users 18 and/or entities 14, 16 are not necessarily waiting on other parties. In certain embodiments, certain agreed-upon timeouts may be used to determine when escalation (e.g., to another user 18 within an entity 14, 16, for example) should occur. In general, the embodiments described herein enable automation of data input, collection, and verification with successive transactions (e.g., writes) for FNOL data blocks in-progress, which preserve state history, leading to a final state correlating all of the data, which is ratified (e.g., attested to) by all entities 14, 16. In addition, the embodiments described herein facilitate custom configurability of interactions with the data curation service 24, for example, to modify the degree of computer-implemented automation versus human interaction for particular data input, collection, and verification steps.

In certain embodiments, the insurance claim data stored on the blockchain 12 may be secured and accessible only to entities 14, 16 (and/or their associated users 18) with appropriate digital security tokens. The use of a blockchain 12 to store the insurance claim data may provide further security due to the characteristics of the blockchain 12. For example, the blockchain 12 may provide (e.g., built-in) security to ensure access is only granted to those entities 14, 16 with approved addresses and/or digital security tokens. The insurance claim data may be stored in a (e.g., unique) record on the blockchain 12, and such a record may be verifiable by multiple sources. The distributed nature of the blockchain 12 may prevent the insurance claim data from being inadvertently or deliberately destroyed.

In certain embodiments, when a user 18 of an entity 14, 16 seeks to transfer an insurance claim to another entity 14, 16, the user 18 may access the blockchain 12 for the insurance claim to retrieve evidence that the entity 14, 16 associated with the user 18 is the current "possessor" (e.g., for data input, collection, and verification purposes) of the insurance claim. Accordingly, the insurance claim data published by the blockchain 12 may provide confirmation that the chain of custody is sound, without gaps or inconsistencies. In certain embodiments, the current possessor entity 14, 16 may be able to access the insurance claim data but the insurance claim data may generally be locked and inaccessible by another entity 14, 16. Accordingly, to facilitate a transfer of the insurance claim, the insurance claim data may be temporarily unlocked to enable access by another entity 14, 16. Based at least partly on their examination of the insurance claim data, a user 18 of the other entity 14, 16 may take possession of the insurance claim. The data curation service 24 may generate a transaction that updates the insurance claim data to indicate transfer of the insurance claim. The transaction may also update the insurance claim data to include other information relating to the insurance claim, for example, prior revisions that have been performed for the insurance claim.

In certain embodiments, each of the entities 14, 16 may have a digital security token that is useable to request access and/or updates to the insurance claim data published by the blockchain 12. In certain embodiments, the digital security token may be a cryptographic key (e.g., a private key) that is unique to an entity 14, 16 and/or a user 18 associated with an entity 14, 16. One or more private keys may be issued to one or more entities 14, 16 and/or users 18 who enable their access to the blockchain 12. The private key(s) may each be associated with a public key corresponding to a particular blockchain 12, and each of the private keys may be employed with the public key to gain access to the blockchain 12. In certain embodiments, other credential(s) may also be used to control access to the blockchain 12. For example, in certain embodiments, a user 18 of an entity 14, 16 may login to a user application 22 using a username, password, personal identification number (PIN), and/or other credentials. The private key of the user 18 and/or entity 14, 16 may be stored on a user device 20 used to access the user application 22, and the private key may be employed by the user application 22 to access the blockchain 12 through, for example, various available Public Key Infrastructure (PKI) standards.

As described in greater detail herein, in certain embodiments, the data curation service 24 acts as an AI intermediary between the entities 14, 16 and the blockchain 12. In certain embodiments, the data curation service 24 may automatically perform operations according to preprogrammed rules that govern the processing of insurance claim data. Such rule(s) may be enforced by the data curation service 24. In certain embodiments, the data curation service 24 may include logic to verify whether a particular verification of a particular insurance claim published on the blockchain 12 is correctly formed. The data curation service 24 may also perform operations to detect possible fraudulent updates to the insurance claim data. For example, in certain embodiments, the data curation service 24 may access sensor data, such as global positioning system (GPS) coordinates of the user device 20 being employed, to access the blockchain 12, and compare that location to a previously detected or otherwise typical location of the user device 20. Discrepancies in the location information from various sources may indicate possible fraud.

In certain embodiments, a federated identity model may be supported. The federated identity model may enable an identity of a user 18 to be verified based on the certification of an entity 14, 16. In such embodiments, a user 18 may request access to the blockchain 12 for a particular insurance claim, and the data curation service 24 may confirm that the digital security token (e.g., key) supplied by the user 18 corresponds with the previously established identity of the user 18. In certain embodiments, instead of, or in addition to, a federated identity model, other data may be employed to authenticate the user 18. Such other data may be unique to the user 18. For example, the user 18 may be authenticated based at least partly on biometric data such as fingerprints, retinal maps, brainwave patterns, and so forth. In such instances, the biometric data may be collected by the data curation service 24 using sensor device(s) that are in proximity to the user 18 and that are known to be trusted (e.g., secured against spoofing or other compromise). In general, certain embodiments support authentication of the user(s) 18 using any suitable number of authentication factors including but not limited to cryptographic keys or other digital security tokens, other credentials (e.g., username, password, PIN, challenge questions, etc.), biometric data, location information, and so forth.

In certain embodiments, the data curation service 24 may make decisions regarding which user(s) 18 are allowed to access and/or update the insurance claim data published on the blockchain 12. The data curation service 24 may morph the methods employed to authenticate user(s) 18 depending on the particular circumstances and/or context of the access requests. For example, a data curation service 24 may determine that there is a likelihood that an access request for insurance claim transfer is fraudulent (e.g., that the user 18 is not who they purport to be). In such instances, the data curation service 24 may require biometric data to be collected regarding the user 18, to verify their identity. Moreover, the data curation service 24 may access other sensors that are in proximity to the user's purported location. Such sensors may capture images, audio data, air samples, hair samples (e.g., for DNA analysis), and/or other information to verify the user's identity and/or presence at a particular location. In certain embodiments, the data curation service 24 may employ machine learning techniques to adjust (e.g., morph) the authentication methods that it employs to authenticate a user 18. The machine learning may be employed to determine a set of factor(s) to be employed to authenticate a user 18 given a particular set of circumstances, where the set of factor(s) minimizes the likelihood of fraud under such circumstances.

In certain embodiments, the user application 22 may provide an interface that enables a user 18 to access the insurance claim data to request transactions to update the insurance claim data (e.g., to facilitate a particular verification of a particular insurance claim). In certain embodiments, in response to a user 18 logging into the user application 22, the interface may present ID(s) for the various insurance claim(s) associated with the user 18 (e.g., insurance claim(s) for which the user 18 and/or the entity 14, 16 associated with the user 18 is a current possessor of the insurance claim(s)). The user 18 may select (e.g., click on) a presented insurance claim ID and, in response, the user application 22 may employ the user's digital security token (e.g., key) to access the blockchain 12 that stores insurance claim data for the selected insurance claim. The insurance claim data may then be retrieved and presented via the interface. The interface may also present various controls or other user interface elements to enable the user 18 to initiate and/or approve transfer of the insurance claim, or otherwise update the insurance claim data (e.g., verifying the insurance claim data, or otherwise processing the insurance claim data).

In accordance with certain embodiments of the present disclosure, each interaction event may be encrypted before being stored on the blockchain 12. In some examples, interaction events can be retrieved and decrypted by credentialed user(s) 18 and/or entities 14, 16. For example, interaction events of persons may be recorded in a respective interaction event record on the blockchain 12, and may be encrypted using a private-public key encryption scheme. For example, a user 18 and/or entity 14, 16 may grant another user 18 and/or entity 14, 16 access to interaction events (e.g., all interaction events, a sub-set of interaction events, and so forth) recorded on the blockchain 12, the users 18 and/or entities 14, 16 may retrieve the interaction events that they have been granted access to (e.g., using one or more predefined credentials), and may decrypt the retrieved interaction events based on the implemented encryption scheme. Because the interaction events, and underlying transaction detail, are provided from the blockchain 12, the accuracy of the interaction event (and transaction detail(s)) can be considered accurate/trustworthy.

In certain embodiments, the data curation service 24 provides an application programming interface (API) that enables the applications 22 to interact with insurance claim data stored on the blockchain 12. Specifically, in certain embodiments, the API of the data curation service 24 may provide tools for creation and interaction with the blockchain 12. For example, the API of the data curation service 24 may include properties and functions that may be called to enable the applications 22 to access insurance claim data stored on the blockchain 12, and to execute functions that enable the applications 22 to enter insurance claim data, transfer the insurance claim data between the entities 14, 16, make revisions to the insurance claim data, and ultimately verify that all of the insurance claim data is correct.

The applications 22 may access the blockchain 12 using the APIs of the data curation service 24, which obey interaction protocols established by the data curation service 24. Customization of the APIs of the data curation service 24 and/or ways in which the applications 22 interact with the data curation service 24 may allow integration between the entities 14, 16 and other applications that wish to access insurance claim data stored on the blockchain 12. Specifically, in certain embodiments, the entities 14, 16 may customize the applications 22 to access the APIs of the data curation service 24 in different ways. For example, the entity 14 may desire that users 18 access the blockchain 12 via the data curation service 24 in a much more manual manner, such as requiring all interactions with the insurance claim data stored in the blockchain 12 to be performed by the users 18. In contrast, the entity 16 may desire that users 18 only need to access the blockchain 12 via the data curation service 24 when automated interactions (e.g., as performed automatically by the application 22 of the entity 16) with the insurance claim data stored in the blockchain 12 are not successful or possible (e.g., for security reasons, internal policy reasons, and so forth).

Such flexibility does not decrease security of interactions with the insurance claim data stored on the blockchain 12 as the data curation service 24 includes programming that ensures that all rules of interaction, including security checks, are followed. For example, in certain embodiments, a public key infrastructure may also be used to encrypt transactions and prevent unauthorized access. In such situations, a user 18 may encrypt a transaction parameter using a public-private key pair to produce a transaction that can only be readily understood by the data curation service 24.

To interact with insurance claim data stored on the blockchain 12, the API of the data curation service 24 may provide a list of member functions of the data curation service 24. Using an application 22, a user 18 may chose a member function, and provide inputs or parameters associated with the function. For example, the API of the data curation service 24 may provide functions, such as functions to query insurance claim data, to create a new instance of insurance claim data, to display insurance claim data, to verify certain insurance claim data, to revise certain insurance claim data, to delete insurance claim data, and so forth.

As such, the data curation service 24 described herein enables a state-based data curation model that implements a deterministic state machine that progressively modifies the state of a data record (e.g., an insurance claim record) from an "initial" state to a "final" state, where multiple entities 14, 16 (e.g., insurance carriers) verify that the data that has been recorded in the blockchain 12 by, for example, requiring attestations from all of the entities 14, 16 that are associated with the data record. More specifically, the data curation service 24 is configured to ensure that the final data block stored in the blockchain 12 for a particular data record has been approved by each of the entities 14, 16 that have an interest in the data record. Accordingly, the data curation service 24 enables a reliable data checkpoint system for a given incident relating to the data record, which may be used for future processes such as subrogation, arbitration, litigation, and other such processes. For example, in certain embodiments, the data curation service 24 may be configured to provide a data record to external entities, such as subrogation-related entities, arbitration-related entities, litigation-related entities, and so forth.

Similarly, the data curation service 24 also provides auditable tracking of error history and associated resolution history. For example, in certain embodiments, the data curation service 24 may be configured to prohibit multiple data records to be created for a particular incident such that each unique incident is assigned a unique record identifier (e.g., unique insurance claim identifier) that is recorded in every data block written on the blockchain 12 relating to the incident. Such functionality may, for example, allow an auditor to easily query all data blocks relating to a particular incident from a first data block to a final data block, which has been verified and attested to by all entities 14, 16 involved.

The data curation service 24 also enables continuous refinement by automating the input, collection, and verification of data, thereby reducing the number of touchpoints (e.g., phone calls, emails, letters, and so forth), and the associated delays, required by conventional techniques. In addition, the API of the data curation service provides well-defined error codes, notification architecture, and state descriptions that lend themselves to be iteratively refined with new technology over time to, for example, allow for increasingly more automation of the particular data input, collection, and verification process. These functionalities allow for a high degree of customization on the part of the individual entities 14, 16.

For example, the data curation service 24 also enables automated evaluation for blockchain submission. In certain embodiments, an agent service (e.g., application 22) running on each carrier network may automatically (e.g., without human intervention from user(s) 18) or semi-automatically (e.g., with minimal human interaction from user(s) 18, such as verification and approval) extract relevant data from a new data report (e.g., an auto loss report (ALR)) and submit the data to a blockchain 12. More specifically, in certain embodiments, the API of the data curation service 24 may expose certain function calls that facilitate the agent services (e.g., applications 22) executed by the entities 14, 16 to employ various levels of interaction, whether through automated functions, semi-automated functions, or manual functions. For example, in certain embodiments, the function calls exposed by the API of the data curation service 24 may include function calls that are specifically directed to automated interaction with the blockchain 12 (e.g., that do not include human verification and approval functions on the part of user(s) 18), function calls that are specifically directed to manual interaction with the blockchain 12 (e.g., that specifically include human verification and approval functions on the part of user(s) 18), and multiple variations therebetween. As such, the API of the data curation service 24 enables customization of the degree of human interaction required, depending on the desires of the specific entity 14, 16. For example, in certain embodiments, a first entity 14 may desire to have more human interaction when submitting data to a blockchain 12, whereas a second entity 16 may desire to have no human interaction at all, if possible. Indeed, by enabling customizable levels of human interaction, the API of the data curation service 24 may allow entities 14, 16 to gradually decrease the degree of human interaction required by their own agent services (e.g., applications 22), for example, as the entities 14, 16 become more comfortable with the functionality provided by the data curation service 24.

Similarly, the data curation service 24 also enables automated querying of the blockchain 12. For example, in certain embodiments, the API of the data curation service 24 includes a notification architecture (e.g., suite of function calls and related properties) that are configured to automatically invoke the agent services (e.g., applications 22) running on the networks of the entities 14, 16 to respond by either invoking automated querying services to, for example, correct invalid data or to escalate a query to a human respondent (e.g., a user 18), if desired by the entity 14, 16. In other words, in certain embodiments, when the data curation service 24 determines that certain data verification is needed from a particular entity 14, 16, the data curation service 24 may send a notification to an agent service (e.g., application 22) for that particular entity 14, 16, which may prompt the agent service to take action by, for example, either automatically querying back end components (e.g., data servers, and so forth) to provide the data curation service 24 with required response data or prompting a user 18 associated with the entity 14, 16 that response data is required.

In addition, the data curation service 24 also provides a data input, collection, and verification system that is designed for configurability so that, for example, step-wise refinement towards greater and greater degrees of automation may be possible as the individual entities 14, 16 become more comfortable with the functionality provided by the data curation service 24. In particular, the data curation service 24 provides a testable and deterministic path for the data input, collection, and verification of data records stored in the blockchain 12. In other words, the entire system 10 described herein may be specifically programmed with certain performance monitoring parameters. For example, in certain embodiments, notification timeouts may be used to specify an amount of time after which human (e.g., user 18) intervention may be needed if an adverse entity 14, 16 has not responded to a request sent via the data curation service 24. In addition, in certain embodiments, automated query timeouts may be used to specify an amount of time after which a query for information may be escalated to a human (e.g., user 18) if the query is not automatically resolved (e.g., by an application 22). In addition, in certain embodiments, claim attestation timeouts may be used to specify time limits (e.g., upper bounds) set for all entities 14, 16 to verify and cryptographically sign a given data record under review. These performance monitoring parameters may then be tweaked as the entire system 10 matures (e.g., from a test setup to a small-scale deployment to full production), and as machine learning, automation, blockchain platforms, identity management systems, fraud detection systems, and other various underlying technologies develop over time.

In general, a blockchain 12 is a distributed ledger of all transactions that have ever been executed in one or more contexts (e.g., insurance claim data in the present context). A blockchain 12 constantly grows as completed blocks are added with a new set of transactions. In some examples, a single block is provided from multiple transactions. In general, blocks are added to the blockchain 12 in a linear, chronological order by one or more computing devices in a blockchain network of interconnected computing devices that execute a blockchain protocol. In short, the blockchain network can be described as a plurality of interconnected nodes, each node being a computing device that uses a client to validate and relay transactions. Each node maintains a copy of the blockchain 12, which is automatically downloaded to the node upon joining the blockchain network. The blockchain protocol provides a secure and reliable method of updating the blockchain 12, copies of which are distributed across the blockchain network 30, without use of a central authority.

Because all users 18 and/or entities 14, 16 generally need to know all previous transactions to validate a requested transaction, all users 18 and/or entities 14, 16 must agree on which transactions have actually occurred, and in which order. For example, if two users 18 and/or entities 14, 16 observe different transaction histories, they will be unable to come to the same conclusion regarding the validity of a given transaction. The blockchain 12 enables all users 18 and/or entities 14, 16 to come to an agreement as to transactions that have already occurred, and in which order. In certain embodiments, the blockchain network includes so-called miners (e.g., computing devices) that add blocks to a blockchain 12 based on the blockchain protocol. In general, multiple miners validate transactions that are to be added to a block, and compete (e.g., perform work, as described above) to have their block added to the blockchain 12. Validation of transactions includes verifying digital signatures associated with respective transactions.

In accordance with the blockchain protocol, each miner in the blockchain network receives transaction information for one or more transactions that are to be included in a block that is to be added next in the blockchain 12. Each miner provides the reference to the previous (most recent) block in the blockchain 12, details of the transaction(s) that are to be included in the to-be-created block, and the nonce value, to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain 12. Consequently, the respective miner's block is broadcast across the blockchain network. At this point, all other miners cease work (because one miner was already successful), and all copies of the blockchain 12 are updated across the blockchain network to append the block to the blockchain 12. Each miner may be required to produce hundreds or thousands of hash values before any one miner provides a qualifying hash value (e.g., at least the first four characters of the hash value are each zero).

Figure 2:
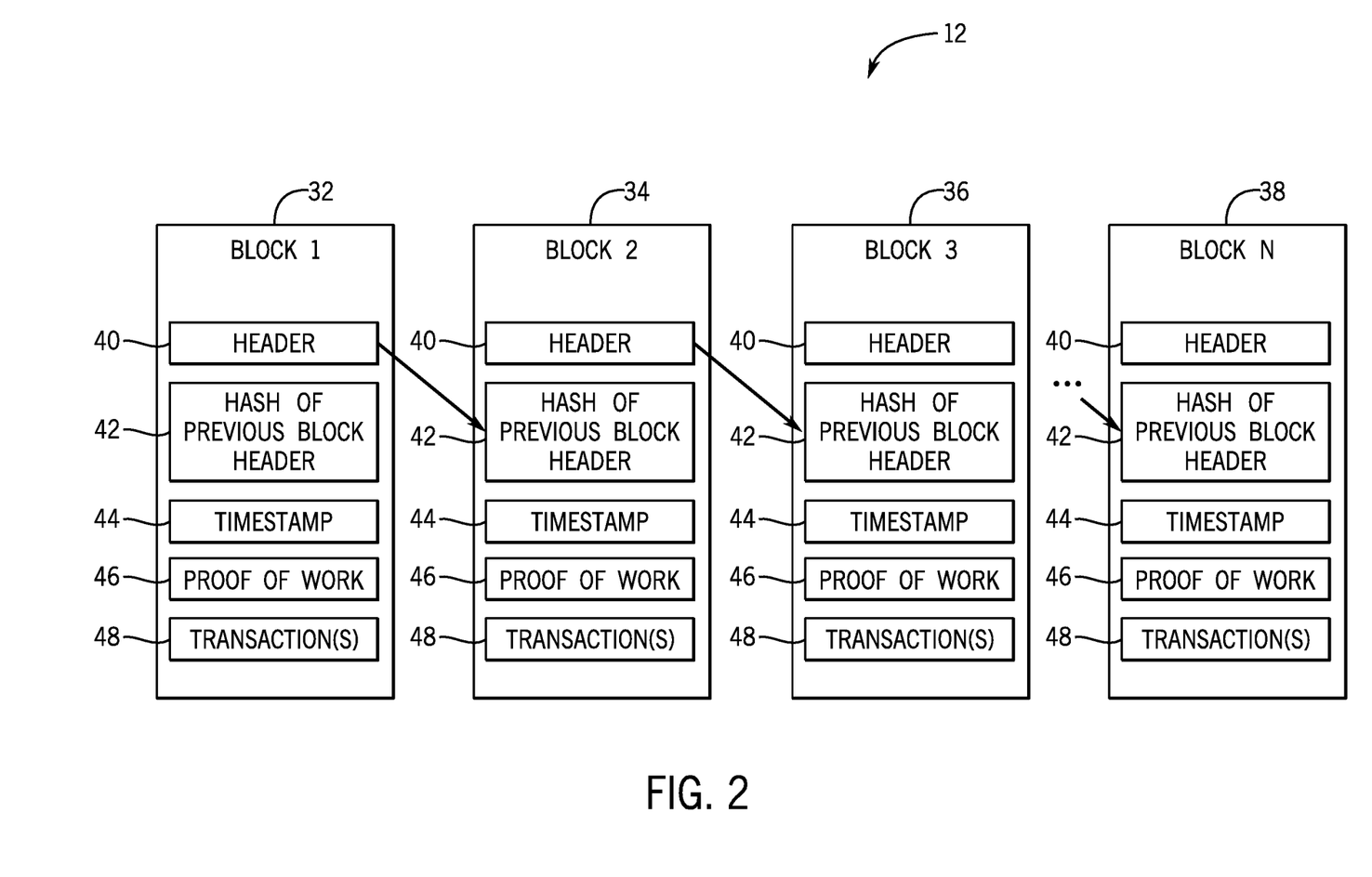
FIG. 2 illustrates a block diagram of a blockchain, in accordance with embodiments described herein.

To provide further context for the present disclosure, a high-level discussion of blockchain technology is provided with reference to FIG. 2. In particular, FIG. 2 is a block diagram of a blockchain 12, in accordance with the embodiments described herein. In the depicted embodiment, the blockchain 12 is illustrated as having multiple blocks 32, 34, 36, and 38. The block 32 (first block in the blockchain 12) may have been created, for example, by the server device(s) and allocated as a special starting block. The block 32 may include a unique header 40 uniquely identifying the block 32 from other blocks in the blockchain 12. Because the block 32 is the first block in the blockchain 12, a hash of a previous block header 42 may be set to zero. A timestamp 44 may include the date of creation for the block 32, and a proof of work section 46 may include certain work that proves that a miner has performed work suitable for the creation of the block 32 and/or to verify transactions in the blockchain 12. The work section 46 may vary based on a protocol used to create the blockchain 12. In certain embodiments, the protocol may include a Merkle tree having a tree data structure in which every leaf node is labelled with a hash (e.g., one-way hash) of a data block and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from our verified blockchain 12, and so on, down the tree. In other words, there's no way to create a fake value that would hash to our expected Merkle tree value (e.g., value stored in section 46 of the block 32), thus creating a single value that proves the integrity of all of the transactions under it.

Transactions, such as transactions relating to entering, revising, and verifying insurance claim data, may be stored in a transactions section 48. Data, related to the transaction may also be stored in section 48 (or in another section). When a new block is created, the block will receive a new header 40 uniquely identifying the new block. As mentioned earlier, a blockchain network may include multiple miners (e.g., computing devices) that add blocks to the blockchain 12 based on the blockchain protocol. In general, multiple miners validate transactions 48 that are to be added to a block, and compete (e.g., perform computing work, as introduced above) to have their respective block added to the blockchain 12. Validation of transactions includes verifying digital signatures associated with respective transactions 48. For a block to be added to the blockchain 12, a miner must demonstrate a proof of work before their proposed block of transactions is accepted by the blockchain network, and before the block is added to the blockchain 12.

In certain embodiments, a blockchain protocol include a proof of work scheme (e.g., Merkle Tree) that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value such that the output hash value cannot be "un-hashed" to determine what the input was. The blockchain protocol can require multiple pieces of information as input to the CHF. For example, the input to the CHF can include a reference to the previous (most recent) block (e.g., hash 42) in the blockchain 12, details of the transaction(s) 48 that are to be included in the to be created block, and a "nonce" value (e.g., a random number used only once). Multiple nodes may compete to hash a set of transactions and to provide the next block that is to be added to the blockchain 12. The blockchain protocol may provide a threshold hash to qualify a block to be added to the blockchain 12. For example, the threshold hash can include a predefined number of zeros (0s) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the blockchain network receives transaction information for one or more transactions that are to be included in a block that is to be added next in the blockchain 12. Each miner provides the reference to the previous (most recent) block in the blockchain 12, details of the transaction(s) 48 that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. If the hash value meets the threshold hash (e.g., at least the first four characters of the hash value are each zero), the respective miner may have successfully created the next block that is to be added to the blockchain 12. Consequently, the respective miner's block is broadcast across the blockchain network. All other miners cease work (because one miner was already successful), and all copies of the blockchain 12 are updated across the blockchain network to append the block to the blockchain 12. Each miner produce hundreds of thousands (or more) of hash values, before any one miner provides a qualifying hash value (e.g., at least the first four characters of the hash value are each zero).

It is to be noted that any computing device may be miners. Accordingly, as insurance claim data is entered, revised, verified, and so forth, new blocks are added to the blockchain 12, including blocks 32, 34, 36, and 38. Because of the distributed nature of the blockchain network created via the blockchain 12 and the core blockchain framework 28, each node of the blockchain network may include copies of the blockchain 12 and share copies of the blockchain 12 as new peers enter the blockchain network. Each copy of the blockchain 12 may include verified data for all or substantially all of the insurance claims tracked by the blockchain 12. The data is secure, immutable, and more efficiently tracked as new insurance claim data gets is added via the interaction of the applications 22, the data curation service 24, and the core blockchain framework 28.

Figure 3:
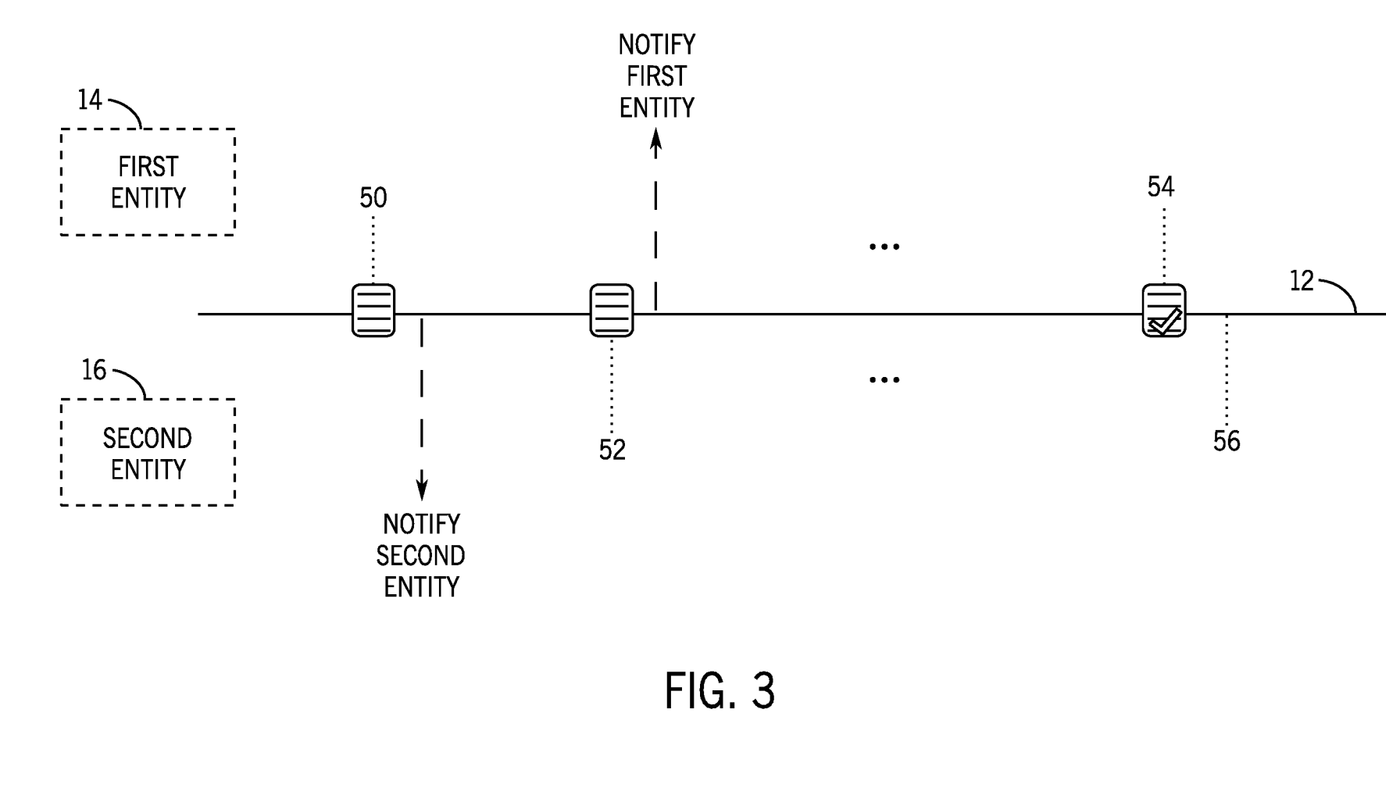
FIG. 3 illustrates an example of a timeline of the exchange of insurance claim data stored on a blockchain, as facilitated by a data curation service, in accordance with the embodiments described herein.

FIG. 3 illustrates an example of a time line of the exchange of insurance claim data stored on a blockchain 12, as facilitated by the data curation service 24, in accordance with the embodiments described herein. As illustrated in FIG. 3, a first entity 14 initiates the creation of an insurance claim. In particular, a first data block in-progress 50 is created in the blockchain 12, wherein the first data block in-progress 50 includes at least some of the data required for the particular type of insurance claim. In certain embodiments, the data curation service 24 receives the initial insurance claim data via an application 22 used by the first entity 14. Upon creation of the first data block in-progress 50 in the blockchain 12, the data curation service 24 may send a communication to notify the second entity 16 of the creation of the first data block in-progress 50.

Then, an application 22 of the second entity 16 (e.g., either through inputs received from a user 18 or in an automated manner performed by the application 22) may make certain additions and/or revisions to the insurance claim data, which may create a second data block in-progress 52, which is substantially similar to the first data block in-progress 50, but includes indications of the data that was added and/or revised by the second entity 16. In certain embodiments, the data curation service 24 receives the added and/or revised insurance claim data via an application 22 used by the second entity 16. Upon creation of the second data block in-progress 52 in the blockchain 12, the data curation service 24 may send a communication to notify the first entity 14 of the creation of the second data block in-progress 52.

As illustrated in FIG. 3, the process may continue back and forth between the entities 14, 16 until one of the entities 14, 16 (e.g., the first entity in the illustrated embodiment) verifies that all of its insurance claim data is correct. In particular, a verified data block 54 is created in the blockchain 12, wherein the verified data block 54 includes all of the verified insurance claim data of the first entity. As also illustrated, the second entity 16 may subsequently also verify that all of its insurance claim data is also correct (as a verified data block 56).

Figure 4:
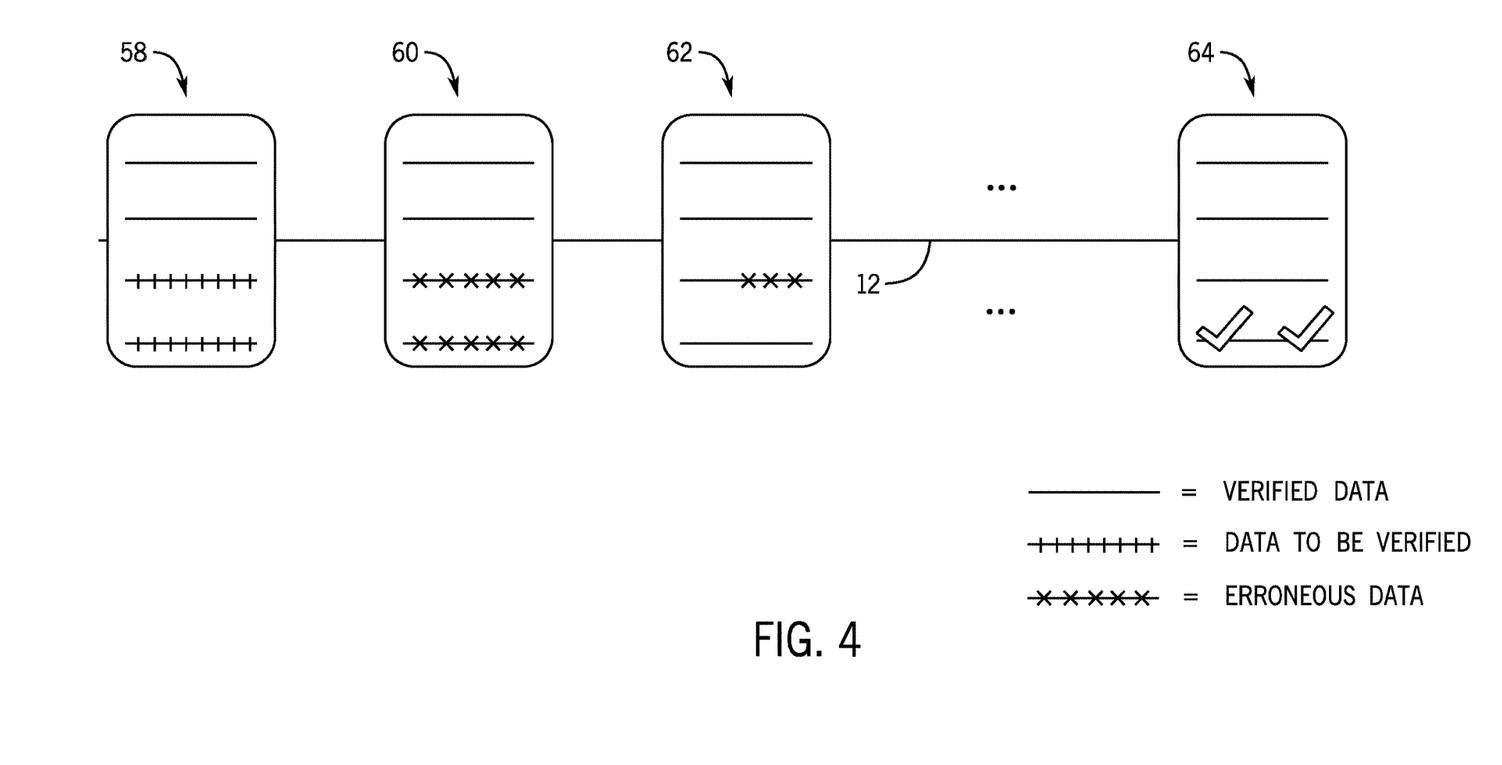
FIG. 4 illustrates a more detailed example of a time line of the exchange of insurance claim data stored on a blockchain, as facilitated by the data curation service, in accordance with the embodiments described herein.

FIG. 4 illustrates a more detailed example of a time line of the exchange of insurance claim data stored on a blockchain 12, as facilitated by the data curation service 24, in accordance with the embodiments described herein. As illustrated in FIG. 4, the first entity 14 initiates the creation of an insurance claim. In particular, a first data block in-progress 58 is created in the blockchain 12, wherein the first data block in-progress 58 includes approximately half of the insurance claim data that is needed marked as verified by the first entity 14, whereas the other half of the insurance claim data is marked as data to be verified. Subsequently, the second entity 16 marks the half of the insurance claim data, which was previously marked by the first entity 14 as data to verified, as erroneous data from the perspective of the second entity 16 in a second data block in-progress 60. Subsequently, the first entity 14 marks some of the insurance claim data, which was previously marked by the second entity 16 as erroneous data, as verified data from the perspective of the first entity 14 in a third data block in-progress 62. Ultimately, once all of the insurance claim data has been verified by both entities 14, 16, both entities 14, 16 may verify all of the insurance claim data as a verified data block 64. In certain embodiments, the verification attestations may be provided by each entity 14, 16 via cryptographic signatures. In particular, in certain embodiments, digital signatures used for providing attestations for the entities 14, 16 may use the public/private key techniques described herein.

Figure 5A:
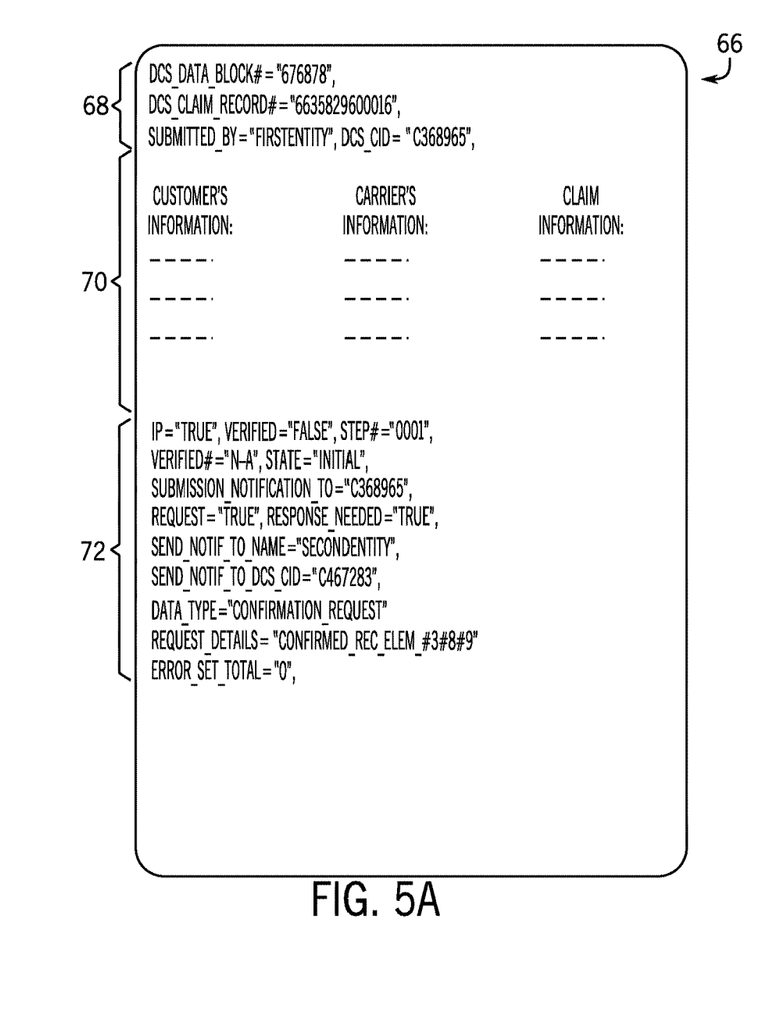
FIGS. 5A and 5B illustrate examples of data structures for the data blocks stored on the blockchain by the data curation service, in accordance with the embodiments described herein.
Figure 5B:
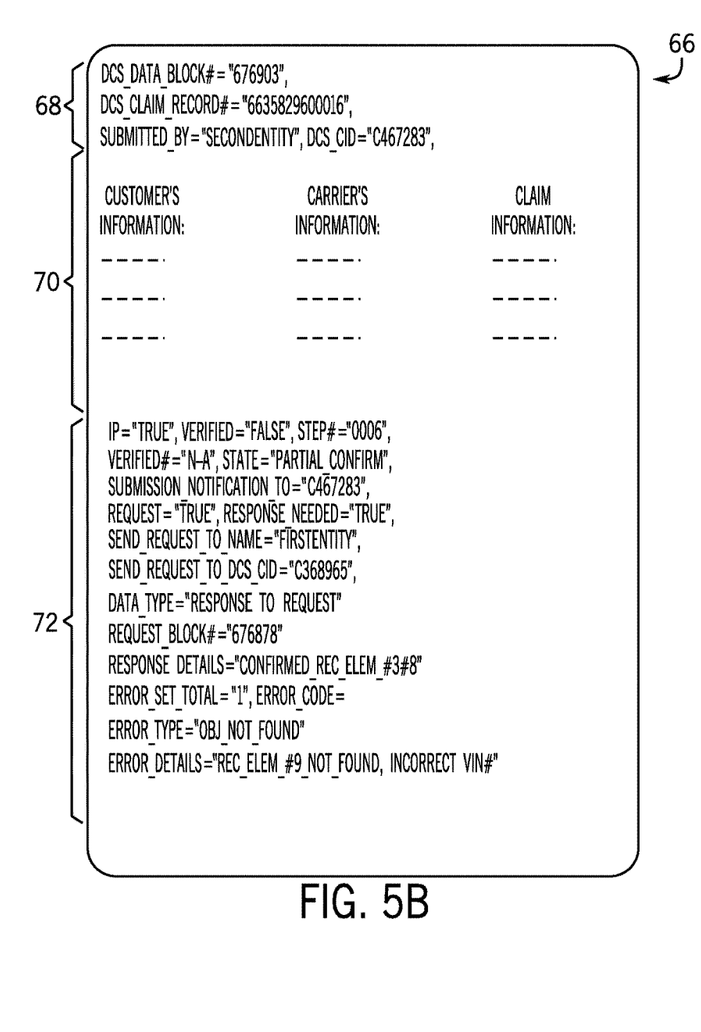

FIGS. 5A and 5B illustrate examples of data structures 66 for the data blocks (e.g., data blocks 50, 52, 54, 56, 58, 60, 62, and 64) stored on the blockchain 12 by the data curation service (i.e., "DCS") 24, in accordance with the embodiments described herein. As illustrated in FIG. 5, in certain embodiments, the data structures 66 may include a data header 68, a detailed data set 70 (e.g., the properties of the insurance claim data to be verified), and metadata 72. For example, in certain embodiments, the data header 68 includes a unique data block number (e.g., "DCS_DATA_BLOCK#") for the particular data block, and a unique claim record number (e.g., "DCS_CLAIM_RECORD#"), which carries through for all data blocks relating to a particular insurance claim. In addition, in certain embodiments, the data header 68 includes an entity name (e.g., "SUBMITTED_BY") and entity number (e.g., "DCS_CID"), which identify the particular entity 14, 16 that is submitting the particular data block.

In certain embodiments, the detailed data set 70 for the data blocks stored on the blockchain 12 may include Customer's Information (e.g., which may include data relating to the customer related to the insurance claim, such as name, address, email address, phone number(s), and so forth), Carrier's Information (e.g., which may include data relating to the insurance carrier, such as name, address, email address(es), phone number(s), and so forth), and Claim Information (e.g., which may include data relating to the insurance claim, such as date of the incident, location of the incident, and so forth).

In addition, in certain embodiments, the metadata 72 includes information relating to the current state of the particular data block, including flags (e.g., "IP" and "VERIFIED", respectively) that indicate whether the particular data block is a data block in-progress or is a verified data block, a step number (e.g., "STEP#") that indicates a number of the step in the verification process, a number (e.g., "VERIFIED#") that indicates a number of a verified data block, and a state indicator (e.g., "STATE") that indicates a current state of the particular data block. As such, the data curation service 24 may implement a deterministic state machine progressively modifying insurance claim data from an "initial" state to a "final" state (e.g., where all data is collected and verified).

In addition, in certain embodiments, the metadata 72 includes notification details for the particular data block, including what entity 14, 16 (e.g., "NOTIFICATION_TO") is requesting the notification, whether (e.g., "REQUEST") a request for input by the notified entity 14, 16 is desired, whether a response (e.g., "RESPONSE_NEEDED") is desired, and an entity name (e.g., "SEND_NOTIF_TO_NAME") and entity number (e.g., "SEND_NOTIF_TO_DCS_CID"), which identify the particular entity 14, 16 that should be notified, upon submission of the particular data block.

In addition, in certain embodiments, the metadata 72 includes confirmation data elements for the particular data block, including the type (e.g., "DATA_TYPE") of confirmation, the details (e.g., "REQUEST_DETAILS") of the confirmation (e.g., a request to confirm record elements 3, 8, and 9, as illustrated in FIG. 5A), and a data block number (e.g., "REQUEST_BLOCK") that needs to be confirmed (e.g., as illustrated in FIG. 5B). Similarly, the metadata 72 includes response details (e.g., "RESPONSE_DETAILS") when the entity 14, 16 is submitting a response (e.g., that the entity 14, 16 has confirmed record elements 3 and 8, as illustrated in FIG. 5B).

In addition, in certain embodiments, the metadata 72 includes error report details, including a number (e.g., "ERROR_SET_TOTAL") of errors, an error code (e.g., "ERROR_CODE"), an error type (e.g., "ERROR_TYPE"), and error details (e.g., "ERROR DETAILS") that summarize the errors (e.g., that record element 9 is not found, and that there is an incorrect VIN#, as illustrated in FIG. 5B), In addition, once the data block has been verified, a signature block (not shown) may be included at the bottom of the metadata 72. As such, the data curation service 24 may enables auditable tracking of error history and associated resolution history by, for example, enabling querying of all data blocks pertaining to a particular incident from a first data block to a final data block.

As such, the embodiments described herein provide well-defined error codes, a notification architecture, and state descriptions that lend themselves to be iteratively refined with new technologies over time to allow for more and more automation of the data collection and verification processes (such as FNOL processes). As described herein, this functionality may allow the system 10 to move, for example, from a state of mandatory escalation to human users 18 to a fully automated system without any intervention from human users 18. Furthermore, by requiring attestations from all entities 14, 16 on the final data block, the embodiments described herein create a reliable data checkpoint regarding the particular incident for future processes (e.g., subrogation, arbitration, litigation, and so forth) to start from.

Figure 6:
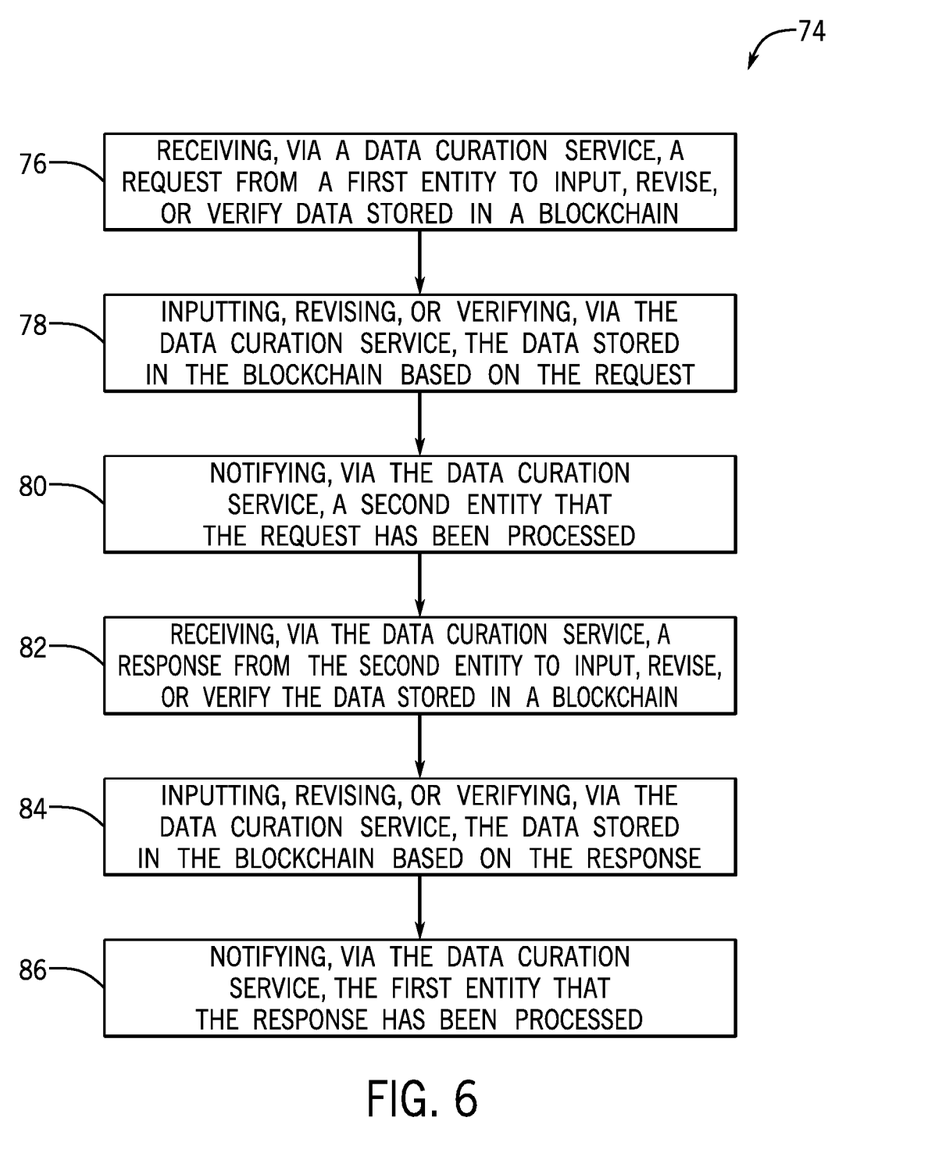
FIG. 6 illustrates a flow diagram of a method of use of the data curation service, in accordance with the embodiments described herein.

FIG. 6 illustrates a flow diagram of a method 74 of use of the data curation service 24, in accordance with the embodiments described herein. In certain embodiments, the method 74 includes receiving, via the data curation service 24, a request from a first entity 14 to input, revise, or verify data stored in a blockchain 12 (block 76). In addition, in certain embodiments, the method 74 includes inputting, revising, or verifying, via the data curation service 24, the data stored in the blockchain 12 based on the request (block 78). In addition, in certain embodiments, the method 74 includes notifying, via the data curation service 24, a second entity 16 that the request has been processed (block 80). In addition, in certain embodiments, the method 74 includes receiving, via the data curation service 24, a response from the second entity 16 to input, revise, or verify the data stored in a blockchain 12 (block 82). In addition, in certain embodiments, the method 74 includes inputting, revising, or verifying, via the data curation service 24, the data stored in the blockchain 12 based on the response (block 84). In addition, in certain embodiments, the method 74 includes notifying, via the data curation service 24, the first entity that the response has been processed (block 86).

Figure 7:
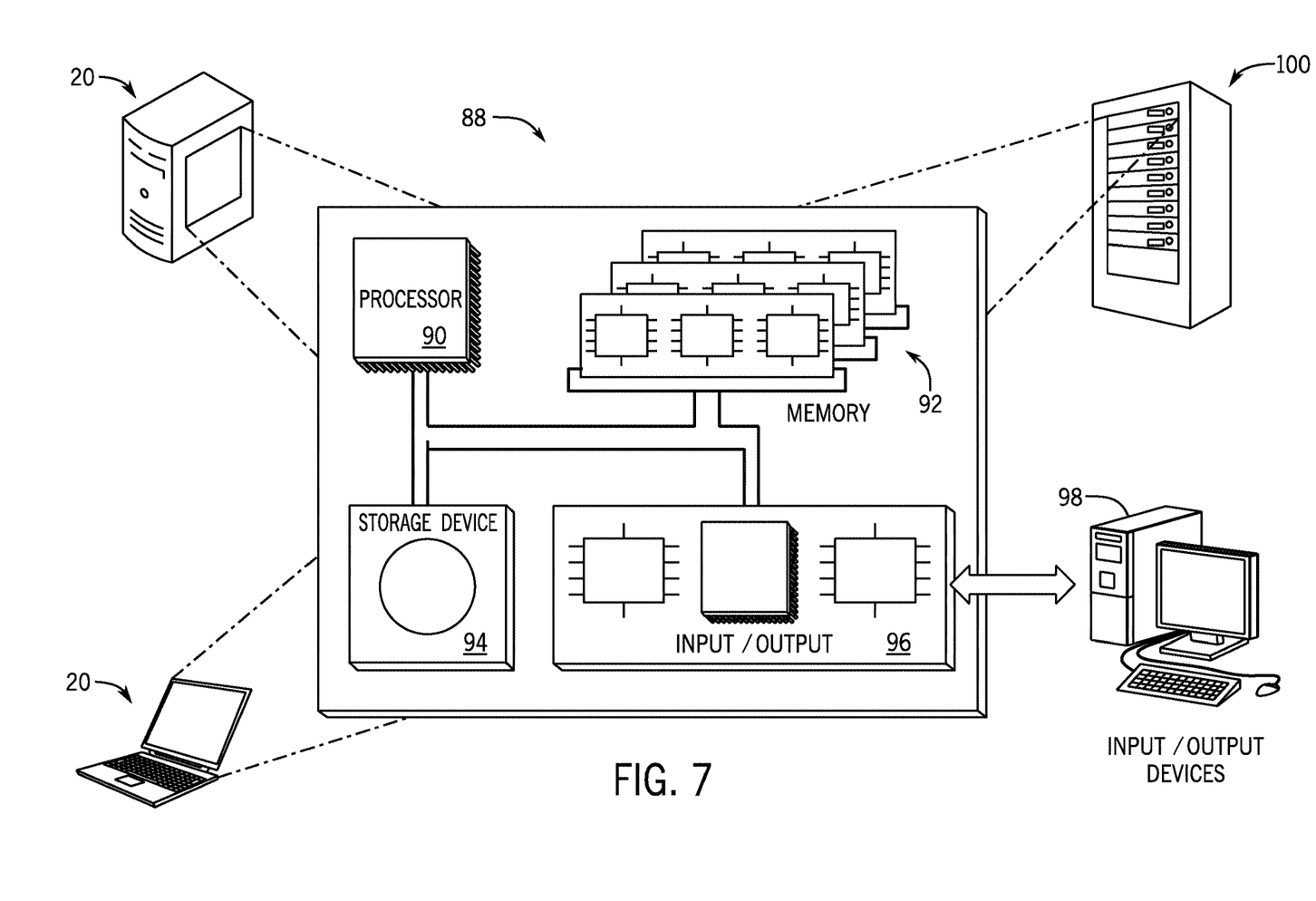
FIG. 7 illustrates a block diagram of a computing system for enabling the system described herein, in accordance with embodiments described herein.

FIG. 7 illustrates a block diagram of a computing system 88 for enabling the system 10 described herein, in accordance with the embodiments described herein. The system 88 may be used for one or more of the operations described with respect to the various embodiments discussed herein, such as performance of some or all of the functions of the data curation service 24 described herein including, but not limited to, the method 74 illustrated in FIG. 6. For example, the system 88 may be included, at least in part, in one or more of user device(s) 20, or other computing device(s) described herein. The system 88 may include one or more processors 90, a memory 92, one or more storage devices 94, and one or more input/output (I/O) devices 98 controllable through one or more I/O interfaces 96. The various components 90, 92, 94, 96, or 98 may be interconnected through at least one system bus, which may enable the transfer of data between the various modules and components of the system 88.

The processor(s) 90 may be configured to process instructions for execution within the system 88. The processor(s) 90 may include single-threaded processor(s), multi-threaded processor(s), or both. The processor(s) 90 may be configured to process instructions stored in the memory 92 or on the storage device(s) 94. The processor(s) 90 may include hardware-based processor(s) each including one or more cores. The processor(s) 90 may include general purpose processor(s), special purpose processor(s), or both.

The memory 92 may store information within the system 88. In certain embodiments, the memory 92 includes one or more computer-readable media. The memory 92 may include any suitable number of volatile memory units and/or non-volatile memory units. The memory 92 may include read-only memory, random access memory, or both. In some examples, the memory 92 may be employed as active or physical memory by one or more executing software modules.

The storage device(s) 94 may be configured to provide (e.g., persistent) mass storage for the system 88. In certain embodiments, the storage device(s) 94 may include one or more computer-readable media. For example, the storage device(s) 94 may include a floppy disk device, a hard disk device, an optical disk device, or a tape device. The storage device(s) 94 may include read-only memory, random access memory, or both. The storage device(s) 94 may include one or more of an internal hard drive, an external hard drive, or a removable drive.

One or both of the memory 92 or the storage device(s) 94 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 88. In certain embodiments, the CRSM may include a data store that provides storage of computer-readable instructions or other information in a non-transitory format. The CRSM may be incorporated into the system 88 or may be external with respect to the system 88. The CRSM may include read-only memory, random access memory, or both. One or more CRSM suitable for tangibly embodying computer program instructions and data may include any suitable type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 90 and the memory 92 may be supplemented by, or incorporated into, one or more application-specific integrated circuits (ASICs).

The system 88 may include one or more I/O devices 98. The I/O device(s) 98 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 98 may also include one or more output devices such as a display, LED(s), an audio output device (e.g., a speaker), a printer, a haptic output device, and so forth. The I/O device(s) 98 may be physically incorporated in one or more computing devices of the system 88, or may be external with respect to one or more computing devices of the system 88.

The system 88 may include one or more I/O interfaces 96 to enable components or modules of the system 88 to control, interface with, or otherwise communicate with the I/O device(s) 98. The I/O interface(s) 96 may enable information to be transferred in or out of the system 88, or between components of the system 88, through serial communication, parallel communication, or other types of communication. For example, the I/O interface(s) 96 may comply with a version of the RS-232 standard for serial ports, or with a version of the IEEE 1284 standard for parallel ports. As another example, the I/O interface(s) 96 may be configured to provide a connection over Universal Serial Bus (USB) or Ethernet. In some examples, the I/O interface(s) 96 may be configured to provide a serial connection that is compliant with a version of the IEEE 1394 standard.

The I/O interface(s) 96 may also include one or more network interfaces that enable communications between computing devices in the system 88, and/or between the system 88 and other network-connected computing systems. The network interface(s) may include one or more network interface controllers (NICs) or other types of transceiver devices configured to send and receive communications over one or more networks using any suitable network protocol.

Computing devices of the system 88 may communicate with one another, or with other computing devices, using one or more networks. Such networks may include public networks such as the internet, private networks such as an institutional or personal intranet, or any combination of private and public networks. The networks may include any suitable type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 88 may include one or more computing devices of any suitable type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Certain embodiments and all of the functional operations described in this specification may be realized in digital electronic circuitry, or in computer software, firmware, or hardware, including the structures disclosed in this specification and their structural equivalents, or in combinations of one or more of them. Certain embodiments may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and/or processor(s) of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, certain embodiments may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Certain embodiments may be realized in a computing system that includes one or more back end components 100, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While only certain features of the disclosure have been illustrated and described herein, many modifications and changes will occur to those skilled in the art. For example, while the embodiments described herein include a specific logic organization for data structures and libraries, such as smart contracts and APIs, substantially similar benefits provided by the present invention may be obtained by trivial structural alterations such as changes in name or in non-substantial changes to the mode of operation of the data structures. It is, thus, to be understood that the appended claims are intended to cover all such modifications and changes as fall within the true spirit of the invention.

The invention claimed is:

1. A method comprising:
exposing, via an insurance claim data curation service, an application programming interface (API) configured to facilitate customization of interaction with insurance claim data stored in a blockchain by one or more agent services executed by first and second insurance carrier entities, wherein the API comprises error codes, a notification architecture, and state descriptions for the insurance claim data stored in the blockchain, and wherein the one or more agent services are configured to automatically process the insurance claim data without human intervention;
automatically invoking, via the API of the insurance claim data curation service, the one or more agent services executed by the first and second insurance carrier entities when interaction with the insurance claim data stored in the blockchain is requested by the insurance claim data curation service;
receiving, via the API of the insurance claim data curation service, an automated request from a first agent service executed by the first insurance carrier entity to automatically input, revise, or verify insurance claim data stored in the blockchain;
automatically inputting, revising, or verifying, via the insurance claim data curation service, without human intervention, the insurance claim data stored in the blockchain based on the automated request; and
notifying, via the API of the insurance claim data curation service, without human intervention, a second agent service executed by the second insurance carrier entity that the automated request has been processed.

2. The method of claim 1, comprising:
receiving, via the API of the insurance claim data curation service, an automated response from the second insurance carrier entity to automatically input, revise, or verify the insurance claim data stored in a blockchain;
automatically inputting, revising, or verifying, via the insurance claim data curation service, without human intervention, the insurance claim data stored in the blockchain based on the automated response; and
notifying, via the API of the insurance claim data curation service, without human intervention, the first insurance carrier entity that the automated response has been processed.

3. The method of claim 2, comprising providing, via the API of the insurance claim data curation service, without human intervention, error notifications relating to the automated request or the automated response.

4. The method of claim 1, comprising authenticating, via the insurance claim data curation service, without human intervention, the first and second insurance carrier entities, users of the first and second insurance carrier entities, or some combination thereof.

5. The method of claim 1, comprising enabling, via the API of the insurance claim data curation service, at least the first and second insurance carrier entities to attest to the insurance claim data stored in the blockchain to verify that the insurance claim data stored in the blockchain is in a final state.

6. The method of claim 1, comprising tracking, via the insurance claim data curation service, without human intervention, an error and resolution history relating to the insurance claim data stored in the blockchain.

7. The method of claim 1, comprising assigning, via the insurance claim data curation service, without human intervention, a unique incident identifier to the insurance claim data stored in the blockchain.

8. The method of claim 1, comprising enabling, via the API of the insurance claim data curation service, automated querying of multiple data blocks associated with the insurance claim data stored in the blockchain.

9. The method of claim 1, comprising implementing, via a state-based insurance claim data curation model of the insurance claim data curation service, a deterministic state machine configured to progressively modify, without human intervention, a state of the insurance claim data stored in the blockchain.

10. A data input, collection, and verification system comprising:
a non-transitory computer readable medium comprising instructions configured to be executed by processing circuitry to create an insurance claim data curation service, wherein the insurance claim data curation service is configured to:
expose an application programming interface (API) configured to facilitate customization of interaction with insurance claim data stored in a blockchain by one or more agent services executed by first and second insurance carrier entities, wherein the API comprises error codes, a notification architecture, and state descriptions for the insurance claim data stored in the blockchain, and wherein the one or more agent services are configured to automatically process the insurance claim data without human intervention;
automatically invoke, via the API of the insurance claim data curation service, the one or more agent services executed by the first and second insurance carrier entities when interaction with the insurance claim data stored in the blockchain is requested by the insurance claim data curation service;
receive, via the API of the insurance claim data curation service, an automated request from a first agent service executed by the first insurance carrier entity to automatically input, revise, or verify insurance claim data stored in the blockchain;
automatically input, revise, or verify, without human intervention, the insurance claim data stored in the blockchain based on the automated request; and
notify, via the API of the insurance claim data curation service, without human intervention, a second agent service executed by the second insurance carrier entity that the automated request has been processed.

11. The data input, collection, and verification system of claim 10, wherein the insurance claim data curation service is configured to:
receive, via the API of the insurance claim data curation service, an automated response from the second insurance carrier entity to automatically input, revise, or verify the insurance claim data stored in a blockchain;
automatically input, revise, or verify, without human intervention, the insurance claim data stored in the blockchain based on the automated response; and
notify, via the API of the insurance claim data curation service, without human intervention, the first insurance carrier entity that the automated response has been processed.

12. The data input, collection, and verification system of claim 11, wherein the insurance claim data curation service is configured to provide, via the API of the insurance claim data curation service, without human intervention, error notifications relating to the automated request or the automated response.

13. The data input, collection, and verification system of claim 10, wherein the insurance claim data curation service is configured to authenticate, without human intervention, the first and second insurance carrier entities, users of the first and second insurance carrier entities, or some combination thereof.

14. The data input, collection, and verification system of claim 10, wherein the insurance claim data curation service is configured to enable, via the API of the insurance claim data curation service, at least the first and second insurance carrier entities to attest to the insurance claim data stored in the blockchain to verify that the insurance claim data stored in the blockchain is in a final state.

15. The data input, collection, and verification system of claim 10, wherein the insurance claim data curation service is configured to track, without human intervention, an error and resolution history relating to the insurance claim data stored in the blockchain.

16. The data input, collection, and verification system of claim 10, wherein the insurance claim data curation service is configured to assign, without human intervention, a unique incident identifier to the insurance claim data stored in the blockchain.

17. The data input, collection, and verification system of claim 10, wherein the insurance claim data curation service is configured to enable, via the API of the insurance claim data curation service, automated querying of multiple data blocks associated with the insurance claim data stored in the blockchain.

18. The data input, collection, and verification system of claim 10, wherein the API is configured to facilitate customization of a degree of human interaction with the insurance claim data stored in the blockchain.

19. The data input, collection, and verification system of claim 10, wherein the API comprises functions configured to automatically notify users of the first and second insurance carrier entities when human interaction with the insurance claim data stored in the blockchain is requested by the insurance claim data curation service.

20. The data input, collection, and verification system of claim 10, wherein the insurance claim data curation service comprises a state-based insurance claim data curation model configured to implement a deterministic state machine configured to progressively modify a state of the insurance claim data stored in the blockchain.

\* \* \* \* \*